May 6, 1930.  A. H. STEBBINS  1,756,960
AIR CLASSIFIER
Filed March 21, 1928
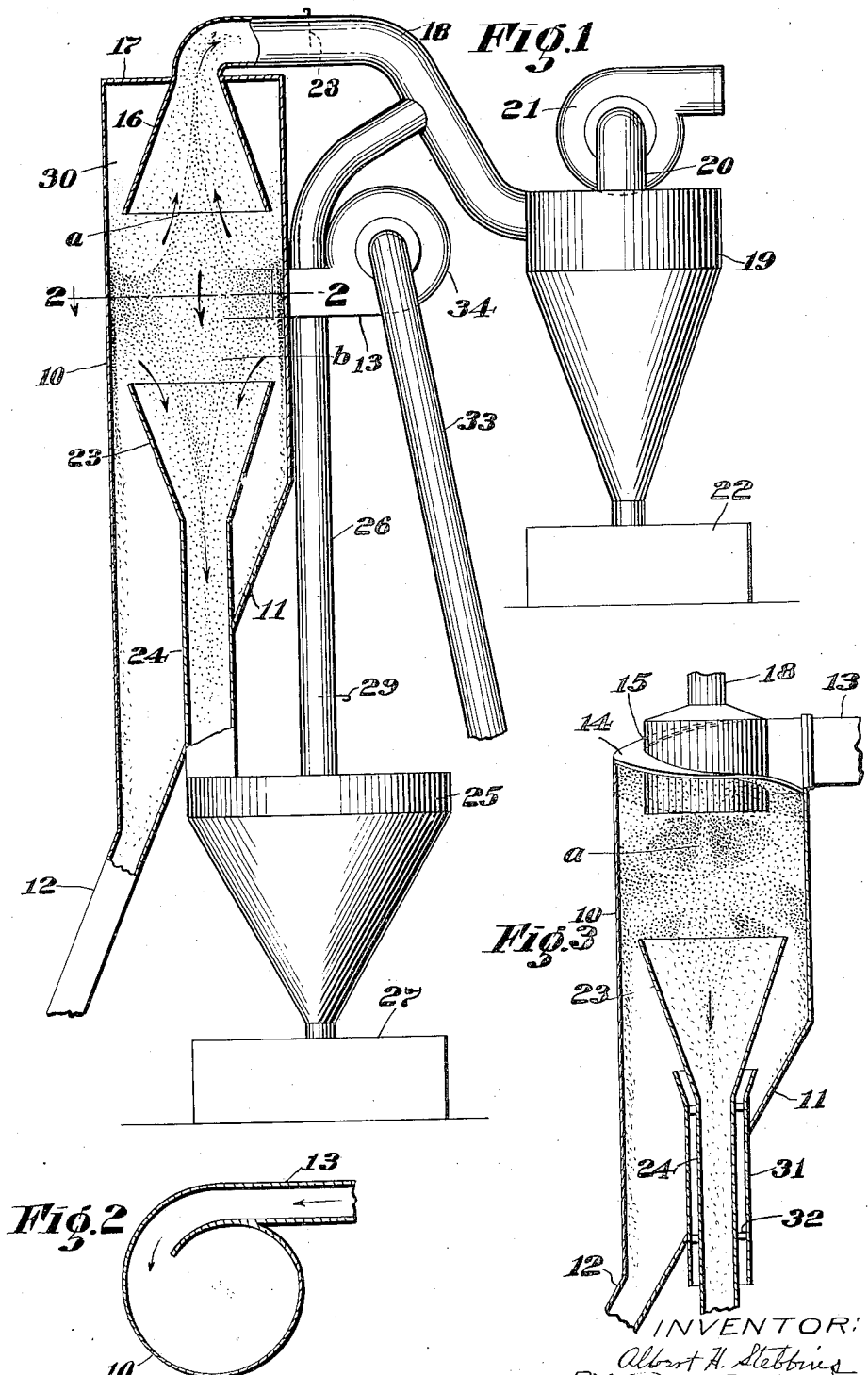

Patented May 6, 1930

1,756,960

UNITED STATES PATENT OFFICE

ALBERT H. STEBBINS, OF LOS ANGELES, CALIFORNIA

AIR CLASSIFIER

Application filed March 21, 1928. Serial No. 263,365.

This invention relates to improvements in air classifiers whereby the finer as well as the coarser particles may be separated out of the air passing through the classifier and collected in separate receptacles.

In air classifiers as commonly constructed heretofore, material laden air is directed into the upper portion of a classifying receptacle to pass downwardly therein with a whirling movement that serves to throw the heavier particles outwardly by centrifugal force against the walls of the receptacle, while the lighter particles will move inwardly towards the center of the receptacle. In these classifiers the air is exhausted from the central portion of the classifier and the lighter particles which remain suspended in the air are carried out of the receptacle with the exhausted air, while the heavier particles move downwardly along the side walls of the receptacle into the lower portion thereof.

It so happens, however, that in these classifiers a considerable amount of the lighter particles will settle out of the air drawn inwardly towards the axis of the classifier and move downwardly into the lower portion of the classifier to become mixed again with the heavier particles, and as a result these air classifiers as constructed heretofore have failed to completely remove the finer from the coarser particles.

The present invention therefore relates to improvements in the type of air classifier just referred to whereby the finer particles may be completely removed from the coarser particles, thus securing a complete separation of the materials, and also the collection of these fine particles as a desired product. These desired results are secured in accordance with the present invention by supporting a container or collecting hopper within the classifier in spaced relation to the side walls thereof so that the lighter particles that may settle out of the air within the central portion of the receptacle will be collected in such hopper and thereby prevented from moving downwardly into the lower portion of the classifier to become mixed with the heavier particles.

A large amount of the fine particles will remain in the air exhausted from the air classifier of the present invention, and these fine particles may be removed from the exhausted air as heretofore by passing this air through a dust collector of any appropriate construction. The product removed from the exhausted air by this dust collector in most cases will be similar to the fine product that settles in said hopper, and if desired the products from these two machines may be mixed. It will therefore be seen that a classifier constructed in accordance with the present invention performs the double function of removing the finer particles more completely than heretofore from the coarser particles, and yields an increased amount of the fine particles collected from the materials being treated. A classifier constructed in accordance with the present invention is well adapted for use in various installations where it is desired to classify the materials that are suspended in air or other fluid such as gas, steam or water. The various features of the present invention and novel combination of parts will be best understood from the following description when read in connection with the accompanying drawings showing preferred embodiments of the invention.

In the drawings:—

Fig. 1 is a vertical sectional view through an air classifier constructed in accordance with the present invention;

Fig. 2 is a sectional view taken on the line 2—2 of Fig. 1; and

Fig. 3 is a vertical sectional view through a modified type of air classifier.

In the embodiment of the invention illustrated in the drawings the classifying receptacle 10 is shown as having a substantially cylindrical construction to facilitate rotation of the air therein about a central vertical axis; it will be understood, however, that the receptacle 10 may be given constructions other than here shown so long as whirling movement may occur within the receptacle. The receptacle 10 is supported in an upright position by any suitable means not shown, and the lower portion of the receptacle has the tapered wall or floor 11 adapted to direct the heavier particles which settle out of the air into the discharge pipe 12.

The material laden air is preferably delivered approximately tangentially into the receptacle through a pipe 13 constructed as shown in Fig. 2 to impart more or less of a whirling movement to the air within the receptacle. The pipe 13 may be disposed a substantial distance from the upper end of the receptacle as shown in Fig. 1, or it may be located at the upper end of the receptacle, as shown in the modified construction of Fig. 3. In the construction of Fig. 1 the material laden air rotating within the receptacle 10 will spread both upwardly and downwardly from the horizontal plane of the supply pipe 13 and the heavier particles will be thrown outwardly by centrifugal force against the walls of the receptacle to move downwardly along these walls. In the modified construction of Fig. 3 the receptacle 10 is provided at its upper end with the spiral cover plate 14 which serves to direct the air downwardly with a rotative movement and the spiral cover plate 14 surrounds the exhaust pipe 15 that extends downwardly within the receptacle from the upper end thereof. The modified construction shown in Fig. 3 will tend to impart a greater whirling movement to the material bearing air than the construction of Fig. 1 but a strong whirling movement is not necessarily desirable since if the centrifugal force resulting from this whirling movement is too great, a large percentage of the fine particles as well as the coarser particles will be carried outwardly against the side walls of the receptacle to settle in the lower portion thereof.

In the embodiment of the invention shown in Fig. 1 an exhaust pipe 16 is provided which extends downwardly through the cover 17 at the upper end of the receptacle and the pipe 16 preferably flares outwardly in a downward direction to facilitate the passage of the air into the suction pipe. Air may be exhausted from the pipe 16 through the pipe 18 which leads from the upper end of the pipe 16 to an exhaust dust collector 19 of any well known or preferred construction. Air is exhausted from the central portion of the collector 19 by the pipe 20 which leads to the suction side of the exhaust fan 21, and the materials that are separated out of the air within the receptacle 19 pass downwardly into the closed bin 22.

As the air moves inwardly towards the central axis of the separator 10 its whirling movement will decrease and this will give the finer particles an opportunity to settle out of the air; and an important feature of the present invention, as above pointed out, resides in a container or collecting hopper 23 which is supported in the lower portion of the receptacle 10 in spaced relation to the side walls thereof, so that the finer particles settling out of the air will enter the hopper 23, while a sufficient space is provided between the upper end of this hopper and the walls of the receptacle 10 to permit the heavier particles to move downwardly through this space. The materials that move downwardly within the hopper 23 are delivered by the pipe 24 to the closed container or classifier 25 from which air may be exhausted by the pipe 26 which communicates with the exhaust pipe 18. The materials that collect in the lower portion of the container 25 are directed into the closed bin 27.

The construction disclosed in Fig. 1 is such that the air within the central portion of the receptacle 10 may be exhausted therefrom in an upward direction through the suction pipe 16, or if desired downwardly through the hopper 23 and discharge pipe 24, and the amount of air that is exhausted either upwardly through the pipe 16 or downwardly through the pipe 24 may be controlled as desired by adjusting the gates or valves 28 and 29.

As the air within the receptacle 10 moves inwardly towards the axis of the receptacle to pass upwardly through the exhaust pipe 16, the whirling movement which was imparted to this air upon entering the receptacle 10 will cause the air to form a vortex, as indicated by $a$ as the air moves upwardly within the exhaust pipe 16. The formation of this vortex will cause more or less of a dead air space to occur directly below the vortex which will materially promote the settling of the lighter particles out of the air that is being exhausted from the receptacle. Likewise, if a substantial suction force is produced within the material discharge pipe 24 the air entering the collecting hopper 23, due to its whirling movement, will also form a vortex as indicated by $b$, and this will tend to promote the settling of the lighter particles out of the whirling air into the hopper 23. In the operation of the classifier shown in Fig. 1 some of the heavier particles may be carried by the whirling air upwardly within the dead air space 30, but this is of no consequence since these particles will simply move downwardly again adjacent the side walls of the receptacle.

In some cases it may be desirable to introduce air from the atmosphere into the lower portion of the receptacle 10 to pass upwardly along the side walls of the collecting hopper 23 to pick up the lighter particles that might tend to move downwardly with the heavier particles into the lower portion of the receptacle 10. Means for introducing this additional supply of air is shown in the modified construction of Fig. 3, wherein the air inlet pipe 31 is shown as extending upwardly within the receptacle through the floor plate 11 and the material discharge pipe 24 may be mounted centrally within the air inlet pipe 31 by providing the supporting brackets 32. In each of the constructions shown the material laden air or other fluid carrying the materials to be treated may be drawn from a dust producing machine or other source of supply through the feed pipe 33 which leads to the suction side of the fan 34, the discharge side of which fan is connected to the pipe 13 above described.

It will be understood from the foregoing that in order to effect a complete removal of the fine particles from the heavier particles, in accordance with the present invention, it is merely necessary to deliver the air or other fluid carrying the particles to be separated into the receptacle with a rotative or whirling movement, and to remove the air from the central portion of the receptacle so that the lighter particles that settle out of the air will enter a collecting hopper supported in the lower portion of the receptacle, while the heavier particles that are thrown against the side walls of the receptacle by centrifugal force will move downwardly along said walls into the lower end of the receptacle.

What is claimed is:—

1. A classifier comprising in combination, a receptacle, means for delivering material laden air into the receptacle with a whirling movement to cause the heavier particles to move outward by centrifugal force against the walls of the receptacle and the lighter particles to move inward toward the central axis of the receptacle, a central exhaust pipe extending downwardly within the receptacle from the upper portion thereof and having its lower end open and positioned so that the whirling air within the receptacle will form a vortex as it passes upwardly into said pipe, means for exhausting air from said pipe, a container mounted in the receptacle in spaced relation to the walls thereof and below said pipe to catch the lighter particles as they settle out of said vortex, and means for drawing air from the receptacle into said container.

2. A classifier comprising in combination, a receptacle, means for delivering material laden air into the receptacle with a whirling movement to cause the heavier particles to move outward by centrifugal force against the walls of the receptacle and the lighter particles to move inward toward the central axis of the receptacle, a central exhaust pipe extending downwardly within the receptacle from the upper portion thereof and having its lower end open, a container mounted in the receptacle in spaced relation to the walls of said receptacle and below and in spaced relation to the end of said pipe, and means for exhausting air from the receptacle upwardly through said pipe so that the lighter particles within the air approaching the exhaust pipe will fall into said container as they settle out of the air.

3. A classifier comprising in combination, a receptacle, means for delivering material laden air into the receptacle with a whirling movement to cause the heavier particles to move outward against the walls of the receptacle and the lighter particles to move inward toward the central axis of the receptacle, a pipe for removing the air in an upward direction from the central portion of the receptacle, a container mounted in the receptacle in spaced relation to the walls of the receptacle to catch the lighter particles that settle out of the air at the central portion of the receptacle, and means for introducing currents of air into the lower portion of the receptacle to pass upward about said container to pick up the lighter particles that tend to move downwardly within the receptacle outside of the container.

4. A classifier comprising in combination, a receptacle, means for delivering material laden air into the receptacle with a whirling movement to cause the heavier particles to move outward by centrifugal force against the walls of the receptacle and the lighter particles to move inward toward the central axis of the receptacle, means for removing the air from the central portion of the receptacle in an upward direction so that as the whirling air rises it will form a vortex within the receptacle, a container mounted centrally in the receptacle in spaced relation to the side walls of the receptacle and having a material discharge pipe extending through a wall of the receptacle, and means for introducing air into the receptacle around said pipe to produce rising air currents about the container.

5. A classifier comprising in combination, a receptacle, means for delivering material laden air into the receptacle with a whirling movement to cause the heavier particles to move outward by centrifugal force against the walls of the receptacle and the lighter particles to move inward toward the central axis of the receptacle, an exhaust pipe for exhausting air in an upward direction from the central portion of the receptacle, a collecting hopper mounted in the receptacle in spaced relation to the walls thereof to catch the lighter particles that settle out of the air that is drawn inwardly toward the central axis of the receptacle, and means below said pipe for exhausting air downwardly within said hopper.

6. A classifier comprising in combination, an upright receptacle, a pipe within the upper portion of the receptacle for conducting air lying near the central axis of the receptacle upwardly out of the receptacle, a container mounted in the lower portion of the receptacle in spaced relation to the side walls thereof and positioned below said pipe, and means for delivering material laden air into an intermediate portion of the receptacle between the pipe and container with a rotative whirling movement to cause the heavier particles to be thrown outwardly against the walls of the receptacle while the lighter particles escape from the receptacle through said pipe and container.

In testimony whereof, I have signed my name to this specification.

ALBERT H. STEBBINS.